United States Patent [19]
Khibnik

[11] Patent Number: 5,505,604
[45] Date of Patent: Apr. 9, 1996

[54] ROTARY MOLD FOR PRODUCING MULTI-COLORED PLASTIC ARTICLES

[76] Inventor: Iosif N. Khibnik, Voronyanskogo 54-8, Minsk 220007, Belarus, U.S.S.R.

[21] Appl. No.: 283,306

[22] Filed: Jul. 29, 1994

[30] Foreign Application Priority Data

Jul. 29, 1993 [SU] U.S.S.R. .................................. 0054401

[51] Int. Cl.$^6$ .............................. A21C 3/00; A21C 11/00
[52] U.S. Cl. ........................... 425/130; 425/435; 425/449
[58] Field of Search .................................. 425/435, 130, 425/447, 449; 118/55

[56] References Cited

U.S. PATENT DOCUMENTS

| | | | |
|---|---|---|---|
| 3,796,533 | 3/1974 | vox | 425/429 |
| 4,894,004 | 1/1990 | Brault | 425/438 |
| 5,328,349 | 7/1994 | Minke et al. | 425/289 |

FOREIGN PATENT DOCUMENTS

1655053  4/1991  U.S.S.R. .

*Primary Examiner*—Robert J. Warden
*Assistant Examiner*—N. Bhat
*Attorney, Agent, or Firm*—Salzman & Levy

[57] ABSTRACT

A rotary plastic molding apparatus having internal packing space is featured. A nozzle is divided into channels equal to the number of casting device disks. Grooves are disposed in casting disks for supplying the melt. The grooves are displaced relative to each other and slots are provided between them to introduce packing lintels. The mold is divided into sections. In each section, an accumulator and sockets for molding articles are provided. The components communicate among themselves and can be oriented at definite angles. The accumulator is disposed before the molds. Holes are provided to supply the melt from the accumulator to the molds. Certain holes can be closed to get a certain article drawing. The transition section of the accumulator is divided into sections for uniform division of the melt. The number of sections is equal to the number of sockets. Centers of sockets are connected with the mold inner space by means of holes for casting articles with lugs or for supplying additional melt component to the socket.

11 Claims, 6 Drawing Sheets

ROTARY MOLD FOR PRODUCING MULTI-COLORED PLASTIC ARTICLES

RELATED APPLICATION

The present patent application is related to USSR patent application no. 00544-01, filed Jul. 29, 1993. Priority is hereby claimed.

BACKGROUND OF THE INVENTION

This patent application pertains to devices for rotational molding of plastic articles and, more specifically, to devices that may be used for production of multi-colored articles with a drawing.

The subject of USSR patent no. 695,083, cl. B29C 41/04, 1976 had the capability of casting multi-colored articles with a drawing, but the number of allowed drawings was limited.

Khibnik's USSR patent no. 1,655,053, cl. B29C 41/04, 1991 disclosed a device similar to the present invention. That device is used to produce multi-colored plastic articles by rotary molding. A rotor is provided with a drive for its own rotation. Spindles (molds) are located along the rotor periphery, adapted to rotate around its axis. The spindles have gear wheels. A casting device is also provided, having disks with grooves connected to the molds by means of packings. Spindles (molds) periodically turn by means of a central gear wheel which interacts with the gear wheels of the molds. Bevelled gear wheels are installed on the shaft, adapted for engagement with two bevelled wheels loosely set on the mechanism transverse shaft. Two tooth half-couplings are disposed on the shaft, so that, by axis displacement, they can interact by turning with the bevel gear wheels' tooth half-couplings. A spring-loaded carriage, on the edge of which the protection is made, is in the shape of a tooth. A link rigidly connected with a transverse shaft can reciprocate from a pusher connected through a rocker with an eccentric. The eccentric is connected with a control handle. A drawing switch is supplied with an article drawing pattern, made in the shape of a gear wheel. The gear wheel is engaged with gear wheel installed on the eccentric.

The aforementioned device has the following drawbacks:
1. Low capacity, since the casting of melt of different colors can be done only serially.
2. Small diversity of drawings.
3. Impossibility of getting a ready-made article with a drawing.
4. Impossibility of getting a drawing in the shape of a ring or a multi-colored spiral.
5. Impossibility of getting a drawing with exact color zone separation.

It would therefore be advantageous to overcome all of these drawbacks in rotational plastic molding device.

SUMMARY OF THE INVENTION

In accordance with the present invention, there is provided a rotary plastic molding apparatus, having internal packing space. A nozzle is divided into channels equal to the number of casting device disks. Grooves are disposed in casting disks for supplying the melt. The grooves are displaced relative to each other and slots are provided between them to introduce packing lintels.

The mold is divided into sections. In each section, an accumulator and sockets for molding articles are provided. The components communicate among themselves and can be oriented at definite angles. The accumulator is disposed before the molds. Holes are provided to supply the melt from the accumulator to the molds. Certain holes can be closed to get a certain article drawing. The transition section of the accumulator is divided into sections for uniform division of the melt. The number of sections is equal to the number of sockets. Centers of sockets are connected with the mold inner space by means of holes for casting articles with lugs or for supplying additional melt component to the socket.

For getting the drawing like a ring or a multi-colored spiral, the transmission ratio of the central gear wheel and the gear wheels on the spindle's axis must be calculated according to the ratio:

$$n_{molds} \text{ rev/min} > n_{rotor} \text{ rev/min} \sqrt{\frac{R_{rotor} - r_{molds}}{r_{molds}}}$$

and must be rounded off to the next greater integer.

For increasing capacity, the number of rotor teeth interacting with a carriage tooth must be equal to the transmission ratio i rounded off to the next higher integer.

$$i = \frac{n_{molds}}{n_{rotor}}$$

For accurate, stable division of the drawing, the sliding bearing stroke is calculated by the formula:

$$L_{max} < \frac{l(1+n)}{2} \quad \text{and} \quad L_{min} > \frac{l(1+2n)}{4}$$

where:
$L_{max}$—maximum stroke providing an accurate added rotation of half-couplings by "n" teeth,
$L_{min}$—minimum stroke providing an accurate added rotation of half-couplings by "n" teeth,
n—added teeth number by which two half-couplings simultaneously rotate per one double half-coupling stroke,
—tooth length by chord.

For providing the necessary sliding bearing stroke, part of the rocker is made in the shape of a slot. During setup, the slot axis displaces along the rocker. After setup, it is rigidly fixed.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Figure 1:
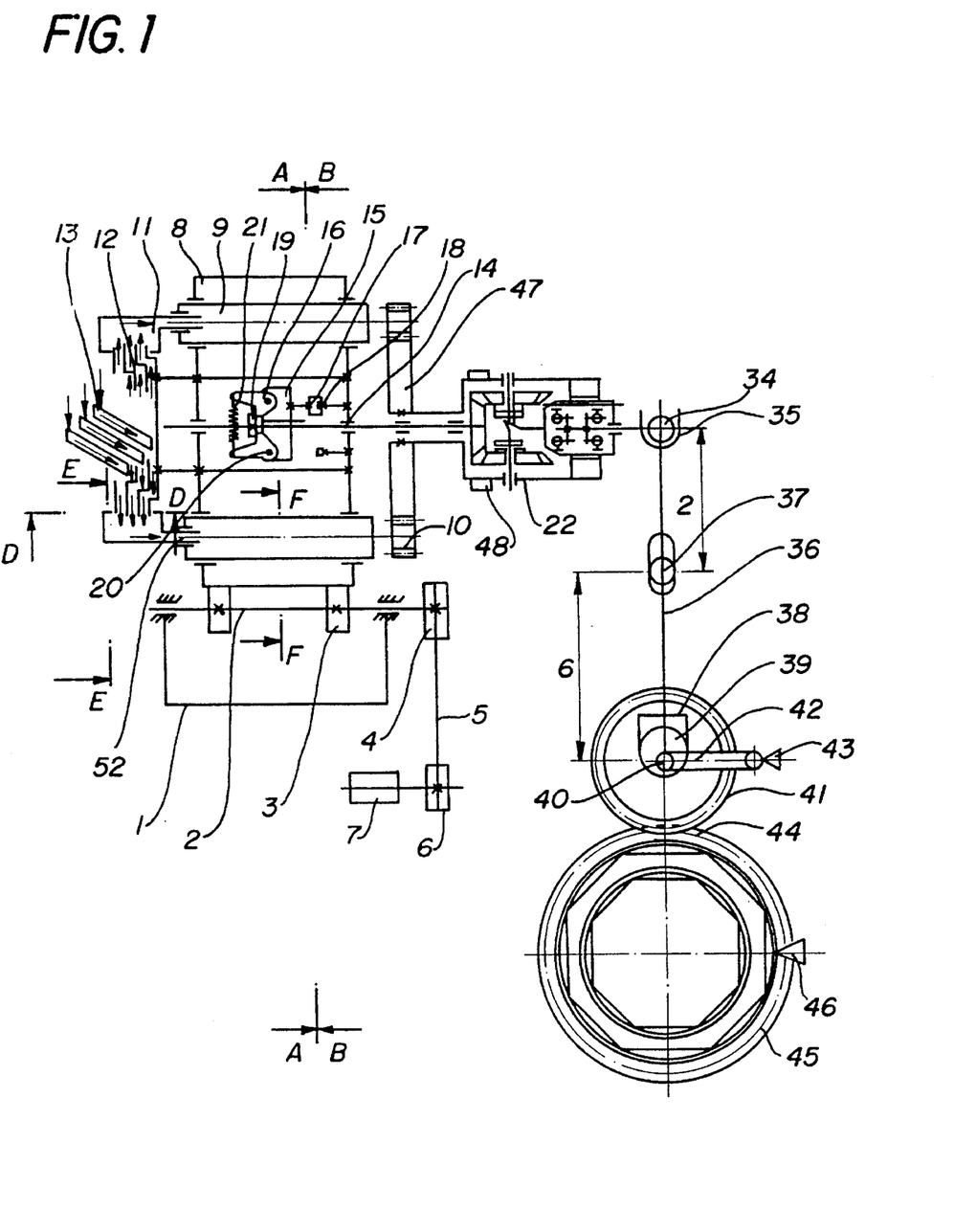
FIG. 1 is a side view of the apparatus of the present invention.

Referring now to the FIGURES, shaft 2 with rollers 3 is installed in base 1 bearings. Pulley 4 is connected to pulley 6 of rotor 7 by means of belt 5 installed on the shaft cone.

Rotor 8 rotates around its horizontal axis and is loosely installed on rollers 3. In the bearings of this rotor 8, spindles 9 rotate around their axes. Gear wheels 10 are attached at one end and packing 11 is inserted onto other ends. Wheels 10 and packing 11 are connected with the casting device, which also includes feeding disks 12 secured to rotor 8 and immobile chutes 13 in the disks 12.

Figure 1A:
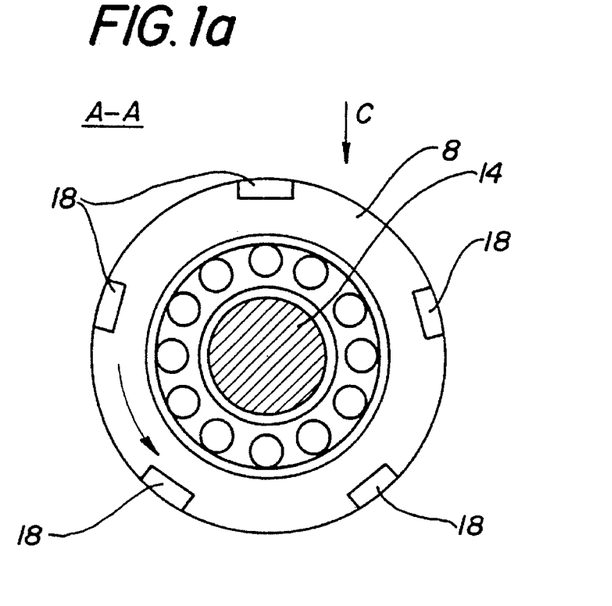
FIGS. 1a, 1b, 1d, 1e and 1f are enlarged perspective views of the rotor, carriage, packing, nozzle and spindles/chutes, taken along lines A—A, B—B, D—D, E—E and F—F, respectively, shown in FIG. 1.
Figure 1B:
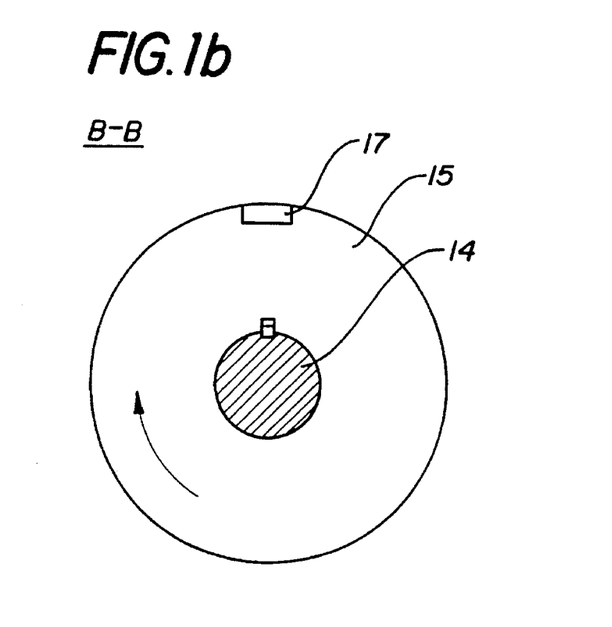

Rotor 8 has a central space in which shaft 14 of spindle periodical turn mechanism is located. On the sliding key of shaft 14 is installed a carriage 15 with spring-loaded plummets toothed 16. A projection is formed on the carriage edge in the shape of a tooth 17. Teeth 18 interact with carriage tooth 17 and are disposed in the rotor space. The number of teeth 18 number depends on the ratio of rotor diameter and article drawing.

To obtain a drawing in the shape of a ring or a spiral, the centrifugal force (affecting the melt) is a result of spindle rotation around its own axis being greater than the effect of forces due to spindle rotation around the rotor axis.

Since the worst conditions of the ring will be in the drawing point located nearest to the rotor axis, the following equation is valid:

$$\frac{\omega_m^2 r_m}{g} > \frac{\omega_r^2 (R_r - r_m)}{g}$$

where $$\frac{\omega_m^2 r_m}{g}$$

—division factor for the mold;

$\omega_m$—mold (drawings) angular velocity;

$\omega_r$—rotor angular velocity;

$r_m$—radius of the drawing;

$R_r$—radius of the rotor (up to the spindle axis).

Solving for $\omega_m$:

$$\omega_m > \omega_r \sqrt{\frac{R_r - r_m}{r_m}}$$

or $$n_m \text{ rev/min} > n_r \text{ rev/min} \sqrt{\frac{R_r - r_m}{r_m}}$$

To provide this relationship, the transmission ratio of the rotational speed of the rotor and the spindle must be equal to the ratio rounded up:

$$I > \frac{\omega_m}{\omega_r \sqrt{(R_r - r_m)/r_m}}$$

or $$I > \frac{n_m \text{ rev/min}}{n_r \text{ rev/min} \sqrt{(R_r - r_m)/r_m}}$$

where I is an integer. The number of teeth 18 must be equal to I.

Figure 2:
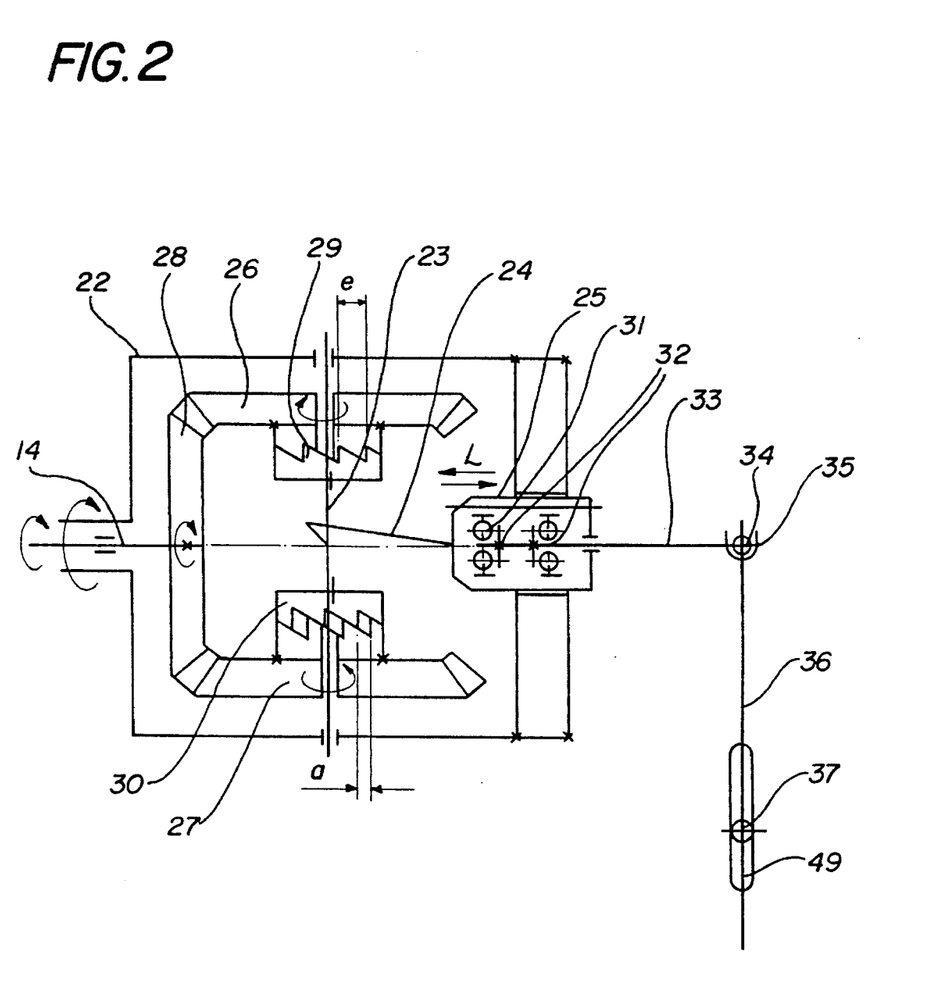
FIG. 2 is an enlarged side view of the division mechanism shown in FIG. 1.

Washer 19 interacts with carriage 15, which is installed at the end of shaft 14. Loads 16 are installed on the carriage 15 and may rotate around axes 20 under the influence of centrifugal force due to rotor rotation. This force overcomes the resistance supplied by spring 21 in connecting the loads. The housing 22 of periodically-turning, division mechanism is loosely set on shaft 14. The bearings of the transverse shaft 23 are rigidly connected with link 24. Sliding bearing 25 is loosely set.

Bevelled gear wheels 26 and 27 are loosely set on shaft 23. They are engaged with driving bevelled gear wheel 28, which is attached to shaft 14. Bevelled gear wheels 26 and have tooth half-couplings which are engaged with tooth half-couplings 29 and 30. Tooth half-couplings 29 and 30 are installed on shaft 23 and possess axial transmission capability. Radial thrust bearings 31 are installed inside of sliding bearing 25. Washer 32 of pusher 33 is pressed against these bearings 31. This pusher 33 ends when pin 34 interacts with fork 35. Rocker 36 then swings around immobile axis 37. Fork 38 is fixed on the other end of rocker 36. This fork 38 interacts with eccentric 39, which rotates around immobile axis 40 with gear wheel 41 under the simultaneous action of control handle 42. The initial position of control handle 42 is determined by indicator 43. Gear wheel 41 interacts with the drawing switch, having the same shape as gear wheel 44, on the surface of which pattern 45 of the article drawing is fixed. The initial position of the pattern is fixed by indicator 46.

To guarantee a simultaneous turn of all spindles by a definite angle, central gear wheel 47 is fastened onto housing 22 of the periodical turn mechanism. Brake blocks 48 are installed so that spindles 9 will turn with greater speed.

To change the spindle rotation around its own axis by a definite angle, rocker 36 must be able to change arms. For this purpose, the socket around axis 37 matches slot 49.

The character of spindle displacement depends on the relation of the stroke of sliding bearing 25 L and the tooth length along the chord of half-couplings 29 and 30 - 1.

At sliding bearing 25, the displacement from the extreme left position to the right half-coupling 30 will equalize the idle stroke and the initial clearance (a). Then, the working stroke will equal (L–a). The teeth of half-coupling 29, and the half-coupling of gear wheel 26, will contact idle stroke (a) and double the working stroke equal to 2(L–a), i.e. 2(L–a)+a.

During combined rotation of the two half-couplings 29 and 30 and one eccentric 39, rotation by a whole number, "n" of teeth demands that the summed idle stroke be less than tooth length 1. That is:

$$2L_{max} - nl < l \quad \text{or} \quad L_{max} < \frac{l(1+n)}{2}$$

Since the maximum clearance at the extreme positions can not be more than the half tooth length, or ½, the minimum stroke necessary for a whole number, "n", of teeth must be determined. Here, the summed idle stroke must be more than half tooth length ½:

$$2L_{min} - nl > l \quad \text{or} \quad L_{min} > \frac{l(1+2n)}{4}$$

Hence, half-couplings 29 and 30 achieve summed rotation by an angle corresponding to nl. Clamping axis 37 is in a position to provide the corresponding arms ratio necessary to produce a sliding bearing L stroke within the limits $L_{max} - L_{min}$ or one revolution of eccentric 39.

Figure 1D:
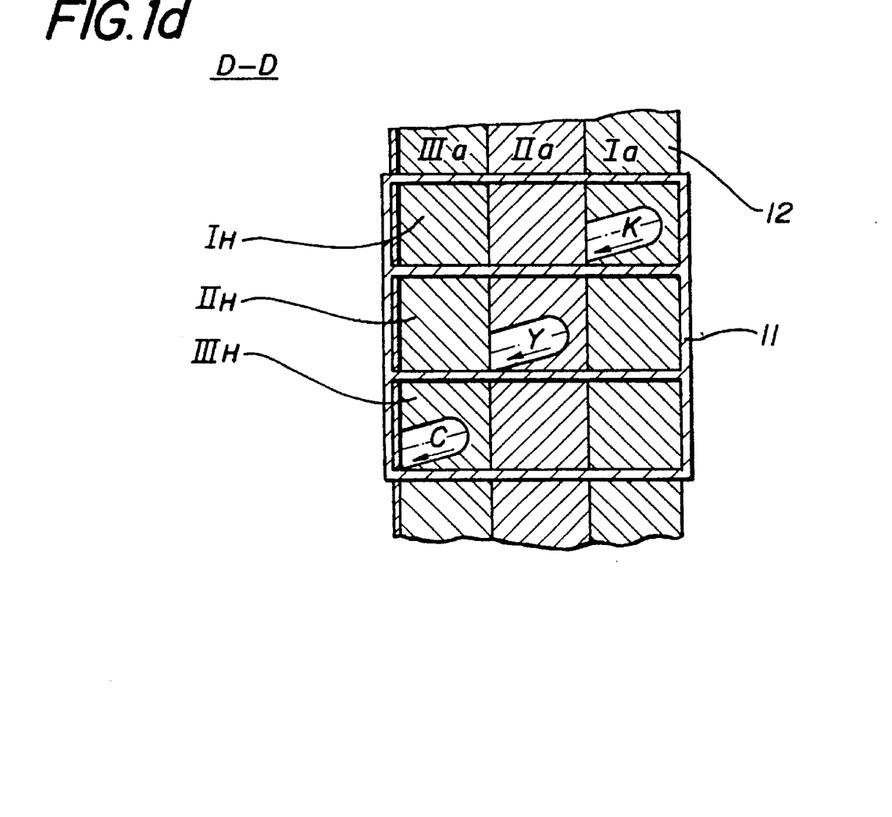
Figure 1E:
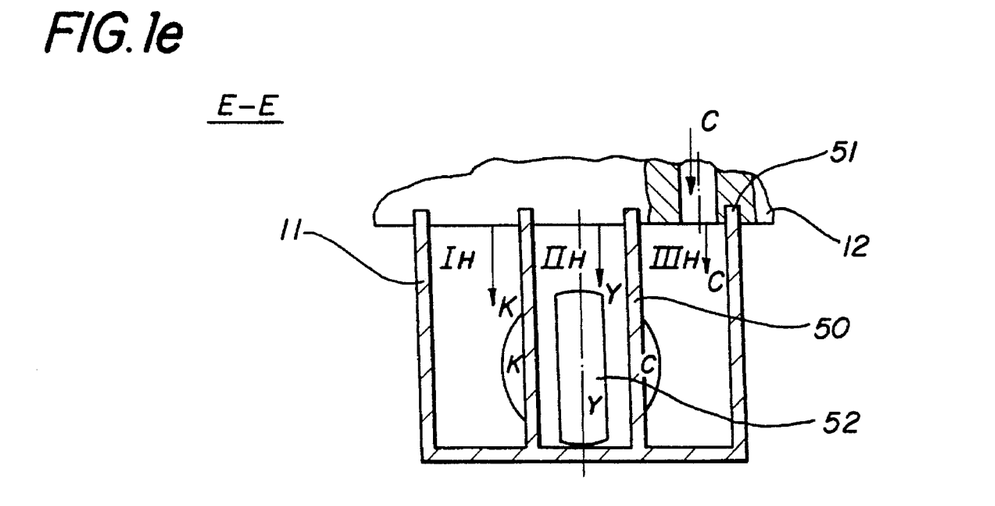

The packing 11 is divided into channels In, IIn, IIIn by lintels 50. The number of channels corresponds to the number of chutes 13. Lintels 50 create slots 51 in disk 12, to form a separate channel for each color: red, blue and green. The separation caused by lintels 50 extends to nozzle 52.

Figure 1F:
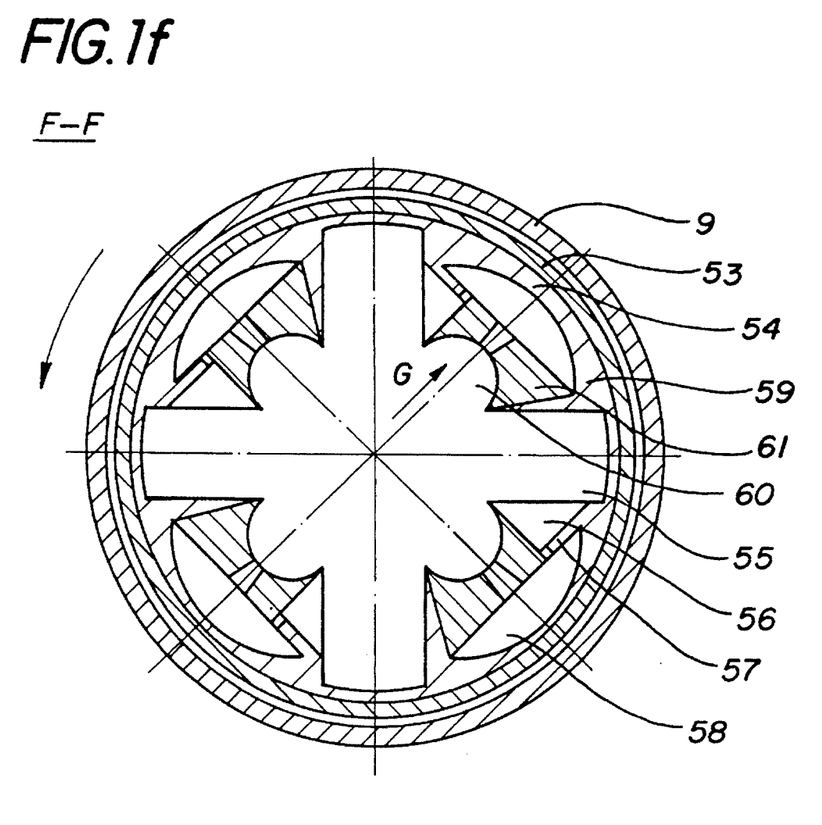
Figure 4:
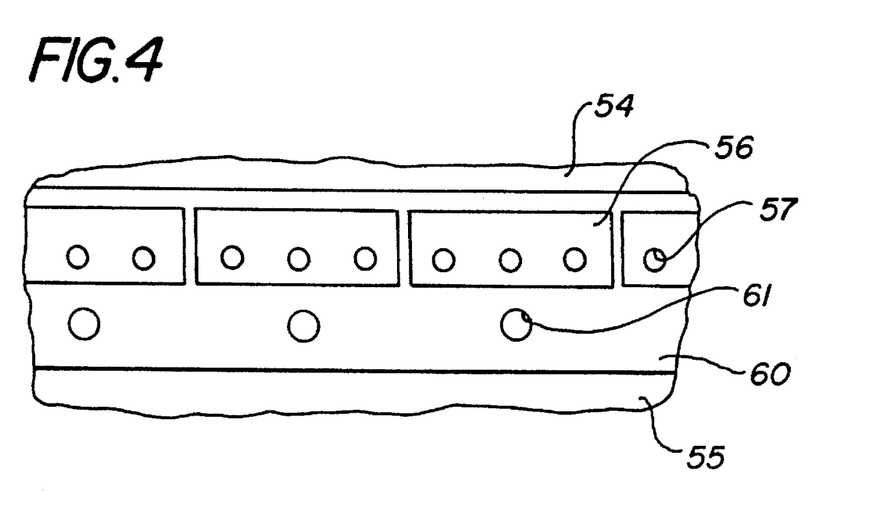
FIG. 4 is a bottom view of the feeders and accumulators shown in FIGURE 1f.

The model 53 is concentrically installed in spindle 9. During production of multi-colored rods, it is used as a tank where the melt is casted. During production of articles such as decorations, buttons, etc., feeders 54 are installed. They have accumulators 55, sections 56 connected with sockets 58 of mold 59 by means of holes 57. Chutes 60 are connected with sockets 58 by means of holes 61. Holes 61 may be used as sockets for a lug. Holes 57 aid the melt cast into the mold sockets. Articles with different drawings may be produced, depending on both the quantity and location of holes 57 and the quantity of the melt layers of different color and density. One of the melt components may be cast through holes 61.

The following is a description of the functioning of this device for casting multi-colored articles. Motor 7 is switched on through pulleys 6 and 4 and belt 5. The rotation is transmitted to shaft 2 by rollers 3 and, hence, rotor 8. At the unbraked blocks 48, the periodical turn mechanism rotates together with rotor 8 and, hence, spindles 9 do not rotate round their own axis.

The melt is casted into chutes 13 and enters disks 12 under the influence of centrifugal force. It then spreads over the periphery of the disks, through channels red, green and blue of the disks. The melt enters channels In, IIn and IIIn of packing 11. Spindle 9 and mold 52 form a segment. When the melt portion solidifies, the rotation around immobile axis 37 is transmitted to rocker 36 through fork 33 rotation. Consequently, fork 35 displaces pin 34. Pusher 33 and washer 32 displace sliding bearing 25 through bearings 31. The rotation shaft 23 of link 24 is also displaced, by a definite angle. Tooth half-couplings 29 and 30 rotate together with shaft 23 by the same angle. When link 24 moves to the left, tooth half-coupling 29 are pressed to bevelled gear wheel 26 under the influence of centrifugal force. This force is produced by the rotation of the periodical turn mechanism. Rotor 8 is rotated clockwise around its axis. Bevelled gear wheel 28, with shaft 14 and carriage 15, rotates with gear wheel 26. The contact with teeth 17 and 18 transmits an additional turn to rotor 8. Together with spindles 9, gear wheel 10 and central gear wheel 47, spindle 9 with mold 52 is rotated around its own axis. At the clockwise turn of the bevelled gear wheel 28, gear wheel 27 is turned counter-clockwise. Half-coupling 30 is thus pushed out to prevent skewing.

During movement to the right of link 24, half-coupling 30 is switched on and half-coupling 29 is switched off. The bevelled gear wheels continue to turn to the same side as during their previous movement.

Depending upon the programmed drawing, the necessary turn angle of shaft 23 and the corresponding stroke of sliding bearing 25 are determined by the formulae:

$$L_{max} < \frac{l(1+n)}{2} \quad \text{and} \quad L_{min} > \frac{l(1+2n)}{4}$$

In order to provide the necessary stroke, axis 37 is fixed in the position at which the corresponding arms ratio is observed.

Drawing pattern 45 turns simultaneously with control handle 42, with the aid of gear wheels 41 and 44. As the drawing pattern 45 approaches indicator 46, control handles 42 are fixed near indicator 43. Afterwards, the next cast of melt of another color is made.

If a drawing in the shape of a ring is to be reproduced, brake blocks are engaged. As a result of this engagement, the periodical turn mechanism and the shaft 14 and carriage 15 stop. Loads 16 rotate around axes 20 under the action of springs 21. Teeth 18 of rotor 8 are released and continue to rotate together loosely. Spindles and gear wheels 10 revolve around immobile gear wheel 47. Then, the melt for emulating a drawing in the shape of a ring may be cast. To obtain a spiral melt, flows of different colors are simultaneously cast.

Figure 3:
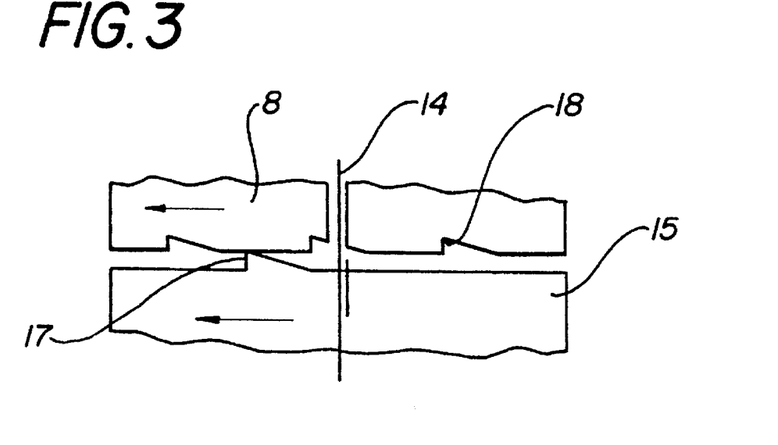
FIG. 3 is a bottom view of the rotor and carriage shown in FIG. 1.

If it is necessary to reproduce a drawing in the shape of a polyhedron, a new polyhedron must be precisely oriented relative to the first one. Brake blocks 48 are then released. Central gear wheel 47 transmits rotation by gear wheels 10 of spindles 9, which start to rotate together with rotor 8. Shaft 14 of the periodical turn mechanism and carriage 15, with loads 16, start to rotate with the same kind of revolution. Under the action of the centrifugal force, load 16 can overcome the restraining force of spring 21. It rotates around its axis 20, comes to washer 19 and displaces carriage 15 along the axis until tooth 17 touches the edge of rotor 8.

Further along, turning control handle 42, shaft 14 is rotated relative to rotor 8 until tooth 17 registers one (any) of teeth 18 that corresponds to the same position of article drawings and a pattern. The position at which tooth 17 and one of teeth 18 have registered can be determined by light and sound signals. After this, having registered drawing pattern 45 with indicator 46, molding of the article can be continued.

In order to produce ready-made decorations, buttons with lugs and other objects, feeders 54 and molds 59 are inserted into mold 53. The mold 53 is installed so that accumulators 55 are located further from the rotor axis. The melt (each color in it own chute) is cast into to chutes 13. When enough melt to fill each socket is casted, the mold is turned by 45° and the whole melt goes into the sockets through holes 57. After hardening, the mold is turned by 45° and the following casting is performed.

If the lug of a molded button (not shown) must be attached to the button itself, then the amount of melt cast to the device must be expanded by the size of the lug. If the lug must be of another color, then the portion of melt first fed must correspond to the color of the button. Once the mold is turned by 45°, the melt corresponding to all size and color of the lugs can be fed.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the current invention, what is desired to be protected by Letters Patent is presented by the subsequently appended claims.

What is claimed is:

1. Apparatus for producing multi-colored plastic articles by rotary molding, comprising:

(a) a rotor having a plurality of teeth and a drive for rotation thereof;

(b) a plurality of spindles rotatably disposed along a periphery of said rotor, said spindles each having a gear wheel;

(c) a casting device having a number of disks with a plurality of grooves, said disks connected to said spindles by means of a packing, said packing having internal space which is divided into channels equal to the number of disks of said casting device, so that a range of articles can be produced thereby;

(d) turning means for turning said spindles, said turning means having a central gear wheel to engage each of said spindle gear wheels, said turning means having a bevelled gear wheel drive, a transmission ratio of said central gear wheel and each of said spindle gear wheels, rounded up to the next integer number, being:

$$n_{molds} \text{ rev/min} > n_{rotor} \text{ rev/min} \sqrt{\frac{R_{rotor} - r_{molds}}{r_{molds}}} \ ;$$

(e) two bevelled wheels loosely set on said spindle turning means, said two bevelled wheels engaging said bevelled gear wheel drive and having two toothed, axially displaceable half-couplings for interacting, seriatim, with said bevelled gear wheel drive;

(f) a spring-loaded carriage having a tooth engageable with a rotor tooth;

(g) a transverse shaft having a pusher for providing reciprocating displacement to a link rigidly connected thereto;

(h) a rocker connected to said pusher via said link, said rocker having an eccentric connected to a control handle; and (i) a drawing switch operatively connected to said control handle and having a drawing pattern in the shape of a gear wheel.

2. The apparatus for producing multi-colored plastic articles in accordance with claim 1, wherein said grooves in casting disks for supplying the melt are displaced relative to each other and slots are disposed therebetween to introduce packing lintels.

3. The apparatus for producing multi-colored plastic articles in accordance with claim 1, wherein said mold is divided into sections, each one of which includes an accumulator and sockets for articles and oriented at a predetermined angle.

4. The apparatus for producing multi-colored plastic articles in accordance with claim 3, further comprising:

(k) holes to supply the melt from said accumulator to said molds.

5. The apparatus for producing multi-colored plastic articles in accordance with claim 3, wherein said accumulator comprises a transition section divided into sections for uniform division of the melt.

6. The apparatus for producing multi-colored plastic articles in accordance with claim 3, wherein the centers of said sockets are connected with the mold inner space by means of holes for casting of articles with lugs or for supplying an additional melt component to the socket.

7. The apparatus for producing multi-colored plastic articles in accordance with claim 11 wherein, for getting the drawing like a ring or a multi-colored spiral, the transmission ratio of said central gear wheel and each of said spindle gear wheels, rounded up to the next integer number, is:

$$n_{molds} \text{ rev/min} > n_{rotor} \text{ rev/min} \sqrt{\frac{R_{rotor} - r_{molds}}{r_{molds}}} \ .$$

8. The apparatus for producing multi-colored plastic articles in accordance with claim 7, wherein said number of rotor teeth interacting with a carriage tooth, when rounded up to the bigger integer number, must be equal to the transmission ratio:

$$i = \frac{n_{molds}}{n_{rotor}}$$

9. The apparatus for producing multi-colored plastic articles in accordance with claim 1 wherein, for accurate stable division of the drawing, the sliding bearing stroke is calculated by the formula:

$$L_{max} < \frac{l(1+n)}{2} \quad \text{and} \quad L_{min} > \frac{l(1+2n)}{4}$$

where:
$L_{max}$—maximum stroke providing an accurate added rotation of half-couplings by "n" teeth,
$L_{min}$—minimum stroke providing an accurate added rotation of half-couplings by "n" teeth,
n—added teeth number by which two half-couplings simultaneously rotate per one double half-coupling stroke,
l—tooth length by chord.

10. The apparatus for producing multi-colored plastic articles in accordance with claim 9 wherein, for providing the necessary sliding bearing stroke, part of said rocker is slotted so that, during setup, the axis displaces along said rocker and, after setup, said rocker is rigidly fixed.

11. Apparatus for producing multi-colored plastic articles by rotary molding, comprising:

(a) a rotor having a plurality of teeth and a drive for rotation thereof;

(b) a plurality of spindles rotatably disposed along a periphery of said rotor, said spindles each having a gear wheel;

(c) a casting device having a number of disks with a plurality of grooves, said disks connected to said spindles by means of packing, said packing having internal space which is divided into channels equal to the number of disks of said casting device, so that a range of articles can be produced thereby;

(d) turning means for turning said spindles, said turning means having a central gear wheel to engage each of said spindle gear wheels, said turning means having a bevelled gear wheel;

(e) two bevelled wheels loosely set on said spindle turning means, said two bevelled wheels engaging said bevelled gear wheel drive and having two toothed, axially displaceable half-couplings for interacting, seriatim, with said bevelled gear wheel drive;

(f) a spring-loaded carriage having a tooth engageable with a rotor tooth;

(g) a transverse shaft having a pusher for providing reciprocating displacement to a link rigidly connected thereto;

(h) a rocker connected to said pusher via said link, said rocker having an eccentric connected to a control handle; and (i) a drawing switch operatively connected to said control handle and having a drawing pattern in the shape of a gear wheel, whereby for accurate stable division of the drawing pattern, a sliding bearing stroke is calculated by the formula:

$$L_{max} < \frac{l(1+n)}{2} \quad \text{and} \quad L_{min} > \frac{l(1+2n)}{4}$$

where:

$L_{max}$—maximum stroke providing an accurate added rotation of half-couplings by "n" teeth, $L_{min}$—minimum stroke providing an accurate added rotation of half-couplings by "n" teeth, n—added teeth number by which two half-couplings simultaneously rotate per one double half-coupling stroke, l—tooth length by chord.

* * * * *